United States Patent
Takamizu (10) Patent No.: US 6,942,294 B2
(45) Date of Patent: Sep. 13, 2005

(54) CHILD CAR SEAT (75) Inventor: Nobuaki Takamizu, Saitama (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 10/827,436

(22) Filed: Apr. 20, 2004

(65) Prior Publication Data

US 2004/0207242 A1 Oct. 21, 2004

(30) Foreign Application Priority Data

Apr. 21, 2003 (JP) ........................................ 2003-116060

(51) Int. Cl.$^7$ ............................................... A47D 1/10
(52) U.S. Cl. .............................. 297/256.16; 297/250.1; 297/256.17
(58) Field of Search ........................ 297/256.16, 250.1, 297/256.17

(56) References Cited

U.S. PATENT DOCUMENTS

| | | | | |
|---|---|---|---|---|
| 5,431,478 A | * | 7/1995 | Noonan | 297/256.16 X |
| 5,676,386 A | * | 10/1997 | Huang | 297/256.16 X |
| 5,772,279 A | * | 6/1998 | Johnson, Jr. | 297/256.16 X |
| 5,865,447 A | * | 2/1999 | Huang | 297/256.16 X |
| 5,947,555 A | * | 9/1999 | Welsh et al. | 297/256.16 X |
| 6,017,088 A | * | 1/2000 | Stephens et al. | 297/256.16 |
| 6,070,890 A | * | 6/2000 | Haut et al. | 297/256.16 X |
| 6,318,807 B1 | * | 11/2001 | Perego | 297/256.16 X |
| 6,331,032 B1 | * | 12/2001 | Haut et al. | 297/256.16 X |
| 6,409,205 B1 | * | 6/2002 | Bapst et al. | 297/256.16 X |
| 6,478,327 B1 | * | 11/2002 | Hartenstine et al. | 297/256.16 X |
| 6,572,134 B2 | * | 6/2003 | Barrett et al. | 297/256.16 X |
| 6,626,452 B2 | * | 9/2003 | Yang et al. | 297/256.16 X |
| 6,641,164 B2 | * | 11/2003 | Wood et al. | 297/256.16 X |
| 6,666,473 B2 | * | 12/2003 | Hartenstine et al. | 297/256.16 X |
| 6,695,400 B2 | * | 2/2004 | Washizuka et al. | 297/256.16 X |

* cited by examiner

Primary Examiner—Rodney B. White
(74) Attorney, Agent, or Firm—Birch, Stewart, Kolasch & Birch, LLP (57) ABSTRACT A child car seat according to the present invention capable of being mounted on a stroller body including a front leg, a hand push rod, and an armrest includes: a child car seat body to be fitted in the stroller body; a locking member disposed on the child car seat body to be engaged with the armrest of the stroller body; and a locking/unlocking mechanism disposed on the locking member. The locking/unlocking mechanism locks the child car seat on the stroller body, and has a locking/unlocking lever, the locking/unlocking mechanism being unlocked and maintained in the unlocked state upon an operation of the locking/unlocking lever. The child car seat further includes a fall prevention member which contacts the stroller body for preventing the child car seat from falling off the stroller body.

22 Claims, 8 Drawing Sheets

CHILD CAR SEAT

This Nonprovisional application claims priority under 35 U.S.C. § 119(a) on Patent Application No(s). 2003-116060 filed in JAPAN on Apr. 21, 2003, the entire content of which are hereby incorporated by reference.

BACKGROUND OF THE INVENTION

1. Field of the Invention

The present invention relates to a child car seat. More particularly, it pertains to a child car seat capable of being mounted on a stroller body.

2. Background Art

When transporting an infant under twelve months old by car, a child car seat is generally used. There has been proposed a child car seat that is detachably attached to a seat of a car. Upon being detached from the seat of the car, the child car seat can be used as a carrier which is moved with the infant lying thereon. Alternatively, the detached child car seat can be mounted on a stroller body to be used as a seat of a stroller.

In a child car seat capable of being mounted on a stroller body, a locking device for fixing the child car seat on the stroller body is disposed either on the stroller body or on the child car seat so as to prevent the child car seat from accidentally falling off the stroller body. The locking device is unlocked only when the child car seat is detached from the stroller body.

In a conventional child car seat capable of being mounted on a stroller body, the locked state is unlocked only when a locking/unlocking lever is operated. Thus, the child car seat has to be detached from the stroller body while operating the locking/unlocking lever. This is disadvantageous in operability when detaching the child car seat. Thus, it has been proposed that, when the locked state is unlocked, a locking member is automatically fixed in an unlocked position.

A conventional child car seat capable of being mounted on a stroller body has a locking device for fixing the child car seat on the stroller body. However, since the locking device is unlocked only when the child car seat is detached from the stroller body, the child car seat has currently no specific function for preventing the child car seat from falling off the stroller body. This is because cases where the unlocked state is sustained may be rare, and in such cases, only a short time is needed for such an operation.

Thus, in the child car seat having the locking member which is automatically fixed in the unlocked position, it is possible that the child car seat is mounted incorrectly on the stroller body, that is, with the locking device not being securely operated. In order to prevent such a wrong use, it must be confirmed whether the child car seat is mounted on the stroller body with the locking device being securely operated or not every time the child car seat is mounted on the stroller body.

As described above, in the child car seat in which the unlocked state is sustained after leaving the locking/unlocking lever as it is, it must be confirmed that the child car seat is mounted on the stroller body with the locking device being securely operated to prevent a wrong use, which is bothersome.

SUMMARY OF THE INVENTION

The present invention is made in view of the above. It is an object of the present invention to provide a child car seat in which an unlocked state is maintained after operating a locking/unlocking lever disposed on the child car seat and leaving it as it is, wherein even when a force pushing the child car seat off the stroller body is applied thereto during the unlocked state, the child car seat can be securely prevented from falling off a stroller body.

A child car seat according to the present invention capable of being mounted on a stroller body including a front leg, a hand push rod, and an armrest, comprises; a child car seat body to be fitted in the stroller body; a locking member disposed on the child car seat body to be engaged with the armrest of the stroller body; a locking/unlocking mechanism disposed on the locking member for locking the child car seat on the stroller body, and having a locking/unlocking lever, the locking/unlocking mechanism being unlocked and maintained in the unlocked state upon an operation of the locking/unlocking lever; and a fall prevention member which contacts the stroller body for preventing the child car seat from falling off the stroller body.

According to the present invention, the fall prevention member extends downwardly from the locking member to contact the front leg of the stroller body.

According to the present invention, the fall prevention member includes a laterally extended locking rod which is mounted on a lower end of a lever extending downwardly from the locking member.

According to the present invention, the locking rod contacts the front leg of the stroller body.

According to the present invention, the fall prevention member includes a pair of levers extending downwardly from the locking member with sandwiching therebetween an armrest boss part projected from a front end of the armrest, and a locking rod connecting lower ends of the pair of levers and positioned forward the front leg.

According to the present invention, the fall prevention member includes an inclination prevention plate disposed on the locking member to be engaged with a boss laterally projected from the front leg of the stroller body.

According to the present invention, the inclination prevention plate has a recess to be engaged with the boss.

According to the present invention, the inclination prevention plate has a slit adjacent to the recess to extend in an advancing direction of the stroller body.

According to the present invention, the fall prevention member includes a locking lever projected from the locking member and extending rearward the stroller body to contact a boss projected from the hand push rod of the stroller body.

According to the present invention, the locking lever is upwardly swingable, and is urged to project rearward the stroller body.

According to the present invention, a spring is disposed between the locking lever and the locking member.

Further scope of applicability of the present invention will become apparent from the detailed description given hereinafter. However, it should be understood that the detailed description and specific examples, while indicating preferred embodiments of the invention, are given by way of illustration only, since various s changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the present invention are described below with reference to the drawings.

Figure 1:
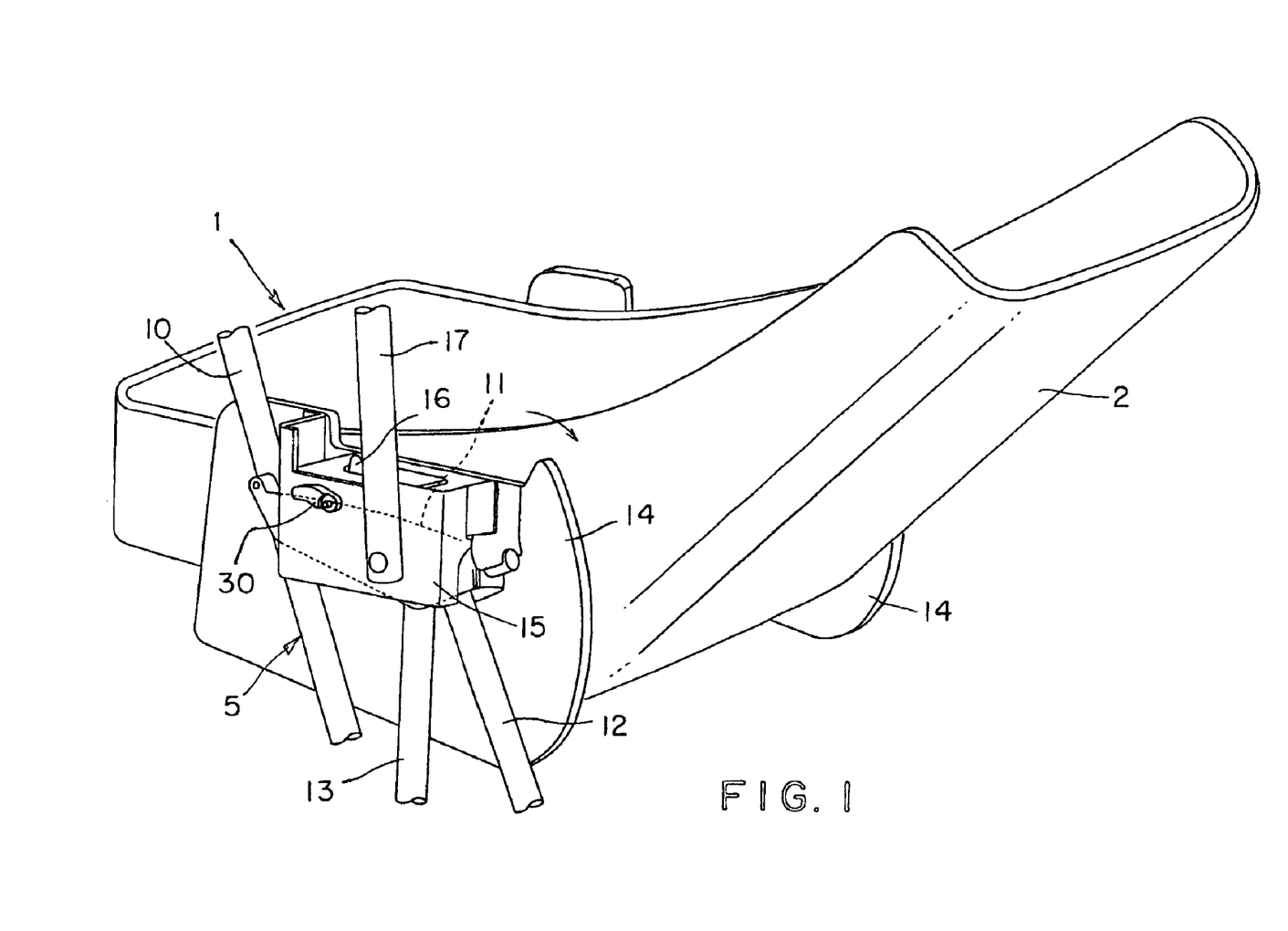
FIG. 1 is a view showing a schematic constitution of a mounting part of a child car seat on a stroller body.

FIG. 1 is an enlarged perspective view showing a schematic constitution of a mounting part of a child car seat 1 on a stroller body 5. The reference number 10 indicates a hand push rod of the stroller body 5. A rear end of an armrest 11 is pivotally coupled to the hand push rod 10. A front leg 12 and a rear leg 13 are pivotally coupled to a front part of the armrest 11.

The child car seat 1 capable of being detachably mounted on the stroller body 5 includes: a child car seat body 2 to be fitted in the stroller body 5; a locking member 15 disposed on the child car seat body 2 to be engaged with the armrest 11 of the stroller body 5; a locking/unlocking mechanism 16 disposed on the locking member 15 for locking the child car seat 1 on the stroller body 5, and having a locking/unlocking lever 30; and a fall prevention member which contacts the stroller body 5 for preventing the child car seat 1 from falling off the stroller body 5. The locking/unlocking mechanism 16 is unlocked and maintained in the unlocked state upon an operation of the locking/unlocking lever 30.

The reference number 14 indicates a support plate correspondent to a side surface of the child car seat body 2. The support plate 14 has the hollow locking member 15 to be engaged with the armrest 11 of the stroller body 5 to mount and support the child car seat 1 on the stroller body 5. The locking/unlocking mechanism 16 described below is arranged in the locking member 15. A handle 17, which also serves as a shade support member of the child car seat 1, is disposed on a side surface of the locking member 15.

Figure 2:
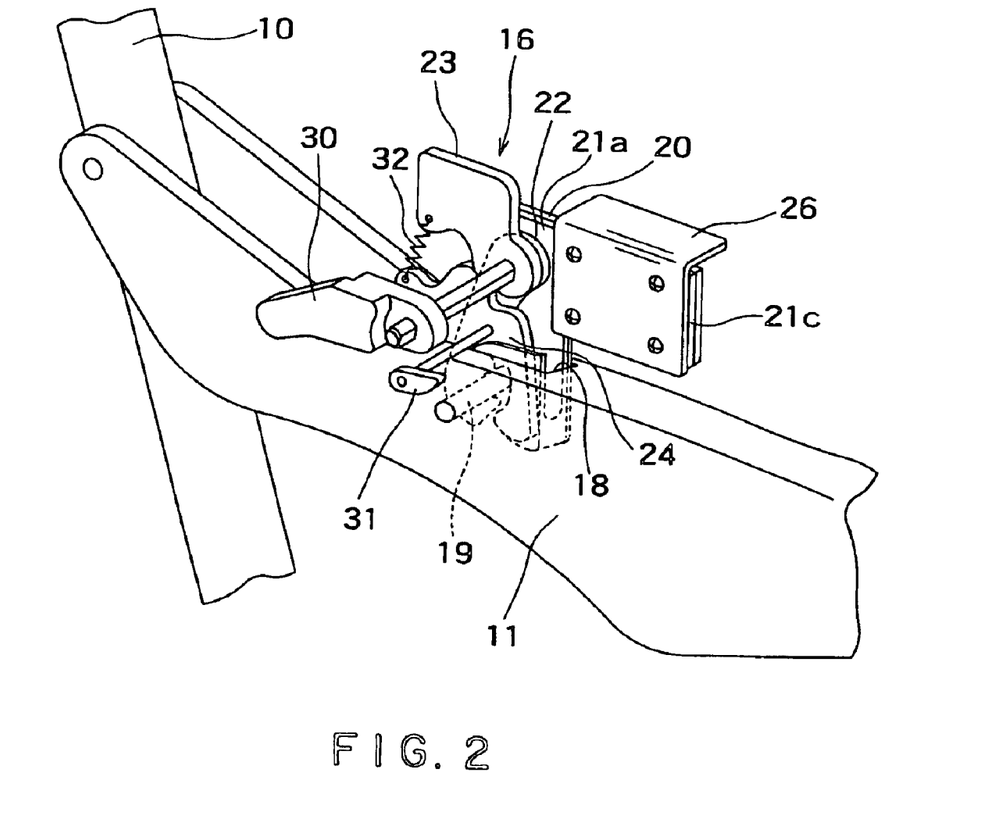
FIG. 2 is a view showing a schematic constitution of a locking/unlocking mechanism.

FIG. 2 is a view showing a relation between the locking/unlocking mechanism 16 and the armrest 11. A narrow elongated hole 18 is formed in an upper surface of the armrest 11. A laterally extending pin 19 for fixing the child car seat 1 is disposed in the armrest 11. The locking/unlocking mechanism 16 can be inserted to the elongated hole 18 so as to be engaged with the pin 19.

Figure 3:
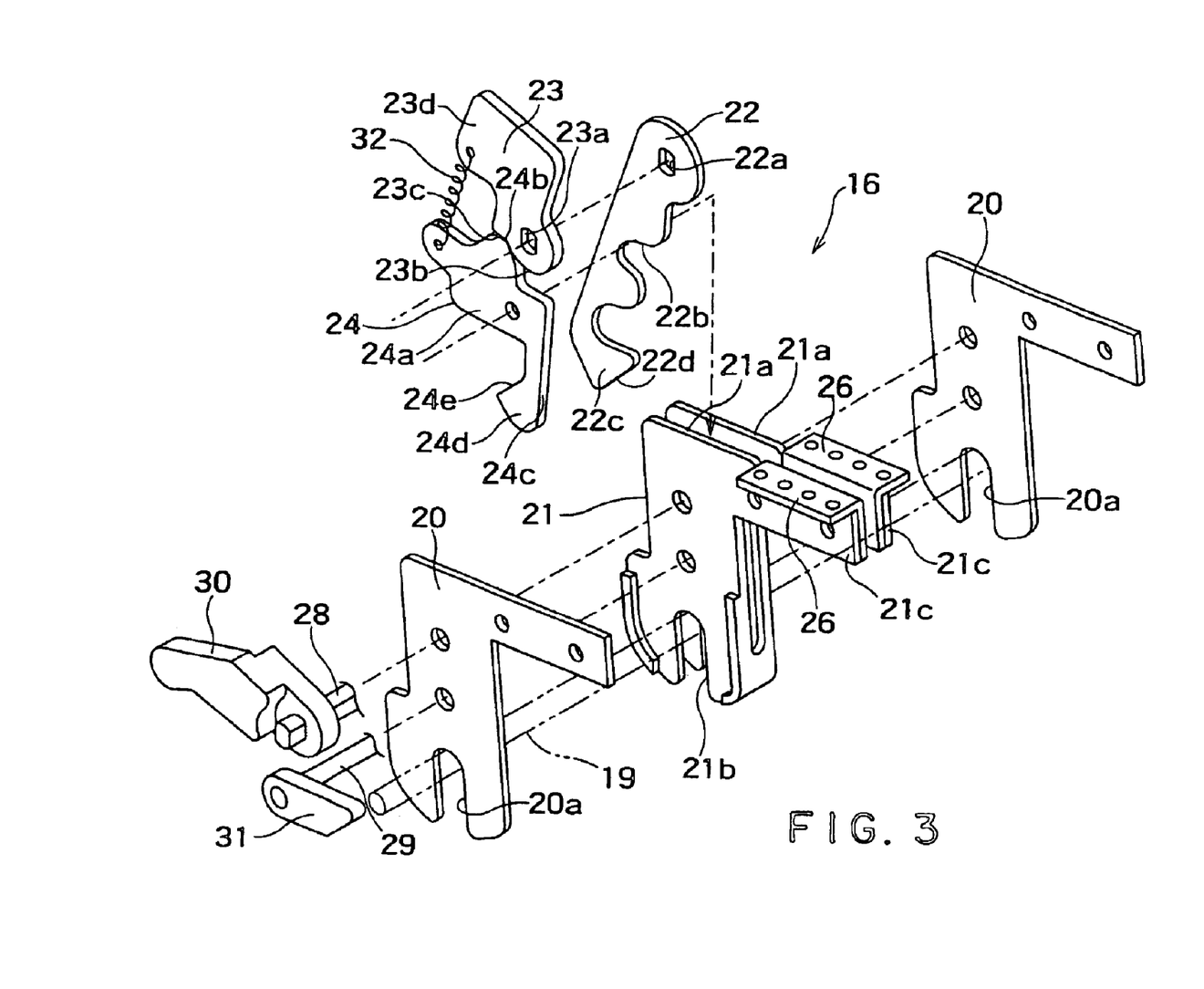
FIG. 3 is an exploded perspective view of the locking/unlocking mechanism.

FIG. 3 is an exploded perspective view of the locking/unlocking mechanism 16. The locking/unlocking mechanism 16 has a locking/unlocking frame 21. Reinforcing plates 20, 20 are mounted on right and left surfaces of the locking/unlocking frame 21. In the locking/unlocking frame 21, there are arranged a lock member 22 formed of a plate, a stopper 23, and a stopper release member 24. The stopper 23 and the stopper release member 24 are disposed on one side of the lock member 22.

Both side plates 21a of the locking/unlocking frame 21 respectively have slits 21b, while the reinforcing plates 20 overlapped with both of the side plates 21a respectively have slits 20a. Each of the slits 21b and 20a extends upward with its lower end opened to be engageable with the pin 19. Arms 21c projected forward from the respective side plates 21a are secured to the locking member 15 through angle members 26. A stopper shaft 28 and a release lever shaft 29, which are hinged on the locking member 15, are rotatably inserted to the locking/unlocking frame 21 and the reinforcing plates 20 overlapped with the side plates 21a of the locking/unlocking frame 21. The lock member 22 and the stopper 23 are secured on the stopper shaft 28. The stopper shaft 28 has cut surfaces on both sides thereof. A hole 22a is formed on an upper part of the lock member 22, and a hole 23a is formed on a lower part of the stopper 23. Both of the holes 22a and 23a are of the same shape as that of the stopper shaft 28. Thus, by fitting the holes 22a and 23a to the stopper shaft 28, the lock member 22 and the stopper 23 are integrally rotated with the stopper shaft 28. An end of the stopper shaft 28 is projected outward out of the locking member 15. The locking/unlocking lever 30 is secured on the projected end. A stopper release member 24 is secured on the release lever shaft 29, and a release lever 31 is secured on a projected end of the release lever shaft 29.

A recess 22b engageable with the release lever shaft 29 is formed in a center part of the lock member 22. A lock claw 22c engageable with the pin 19 is formed on a lower end of the lock member 22. A guide surface 22d, which is inclined such that an end of the claw is upwardly oriented, is formed at a lower periphery of the lock claw 22c.

The stopper 23 is of an inverted L-shape. On a lower part of the stopper 23, an arc 23b is formed about an axis of the hole 23a. A stopper step 23c is formed on one end of the arc 23b. The stopper release member 24 is also of an inverted L-shape, and a center part thereof is secured to the release lever shaft 29. A projection 24b engageable with the stopper step 23c is disposed on a center part of a horizontal arm 24a of the stopper release member 24. A stopper release operation part 24d is formed on a lower end of a downwardly extending arm 24c of the stopper release member 24. The stopper release operation part 24d is engageable with the pin 19 from an opposite side of the lock claw 22c of the lock member 22. An inclined part 24e, which is inclined such that an end thereof is downwardly oriented, is formed at an upper periphery of the stopper release operation part 24d. Between ends of the horizontal arm 23d of the stopper 23 and the horizontal arm 24a of the stopper release member 24, there is disposed a spring 32 which urges both the ends in a tensile direction.

When mounting the child car seat 1 on the stroller body 5, a lower part of the child car seat body 2 is inserted between the right and left armrests 11, and the locking/unlocking mechanisms 16 disposed on both sides of the child car seat 1 are inserted in the respective armrests 11 through the elongated holes 18 thereof. Then, the child car seat 1 is lowered so that the pin 19 is inserted to the slits 21b of the locking/unlocking frame 21 and the slits 20a of the reinforcing plates 20. When the guide surface 22d of the lock member 22 contacts the pin 19, the lock member 22 together with the stopper 23 is rotated clockwise in FIG. 4A by the guide surface 22d in opposition to the spring 32. In accordance therewith, the lock claw 22c is laterally moved from the slits 21b and 20a, whereby the slits 21b of the locking/unlocking frame 21 and the slits 20a of the reinforcing plates 20 are engaged with the pin 19 of the armrest 11.

Figure 4A:
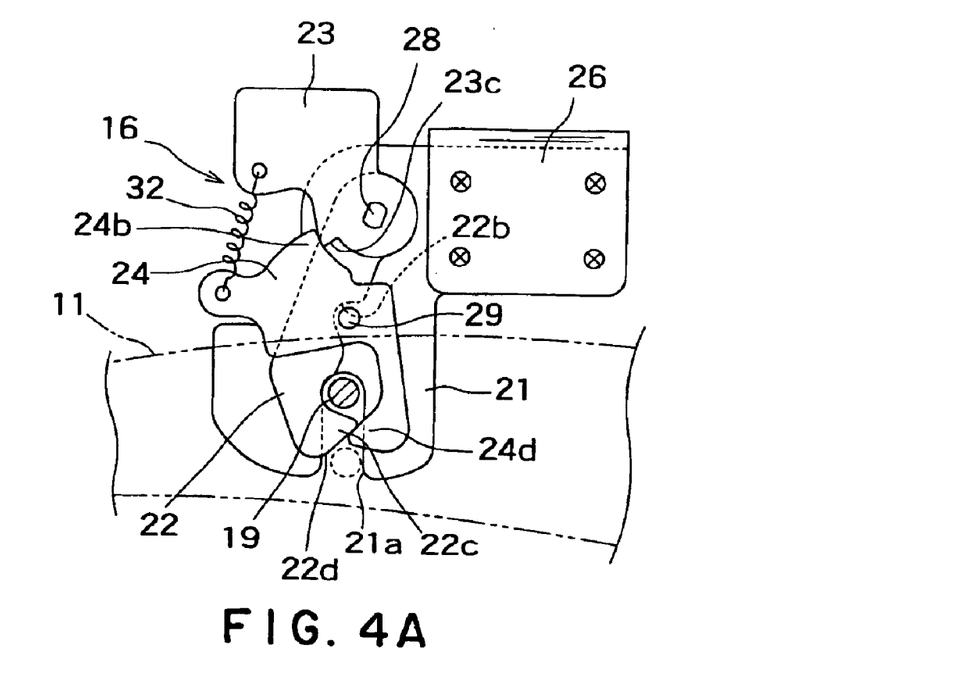
FIGS. 4A and 4B are illustrational views respectively showing an operation of the locking/unlocking mechanism.

In this manner, upon the engagement of the slits 21b of the locking/unlocking frame 21 with the pin 19, the lock member 22 is rotated counter-clockwise by the spring 32 through the stopper 23. Then, the recess 22b is engaged with the release lever shaft 29, the lock claw 22c is engaged with a lower part of the pin 19, and the stopper release operation part 24d of the stopper release member 24 is engaged with the lower part of the pin 19. Thus, the child car seat 1 is locked on the position (FIG. 4A).

Figure 4B:
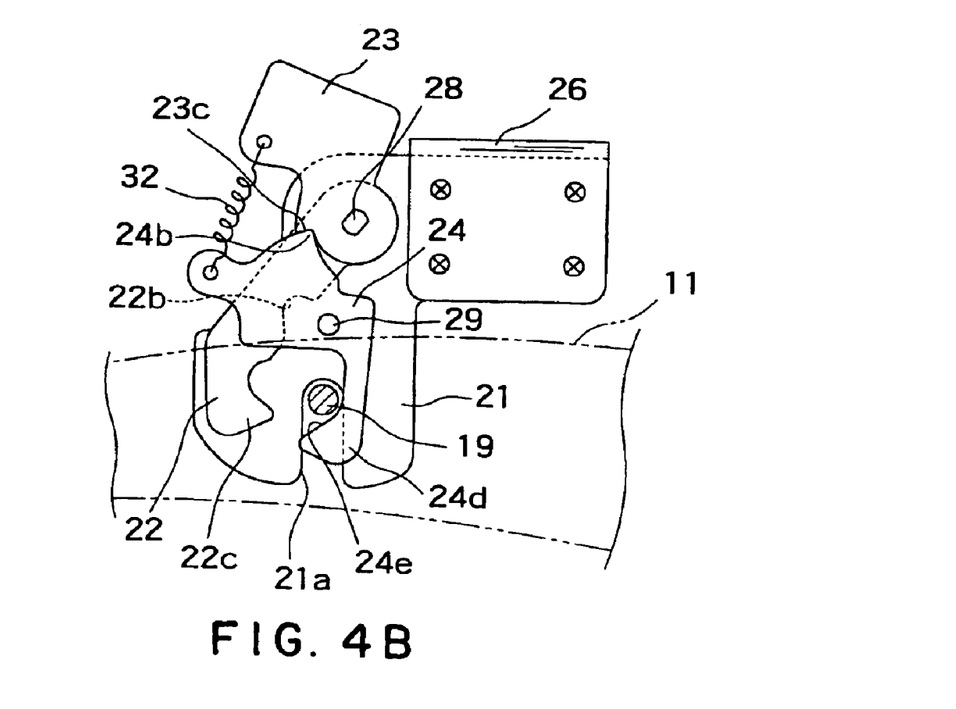

On the other hand, when detaching the child car seat 1 from the stroller body 5, the locking/unlocking lever 30 is rotated clockwise in FIG. 3 with a hand, whereby the lock member 22 is rotated clockwise. Then, as shown in FIG. 4B, the lock claw 22c is moved to an unlocked position. With the rotation of the lock member 22 to the unlocked position, the stopper 23 is simultaneously rotated clockwise by the stopper shaft 28. Then, the projection 24b of the stopper release member 24 is engaged with the stopper step 23c of the stopper 23 by the spring 32. Therefore, the rotation of the lock member 22 is blocked, and the lock member 22 is automatically fixed in the unlocked position.

In this way, even after separating the hand from the lever 30 so as to leave the locking/unlocking lever 30 as it is, the lock member 22 is automatically fixed in the unlocked position. Thus, the child car seat 1 can be detached from the stroller body 5 by simply moving the child car seat 1 upward.

Figure 5:
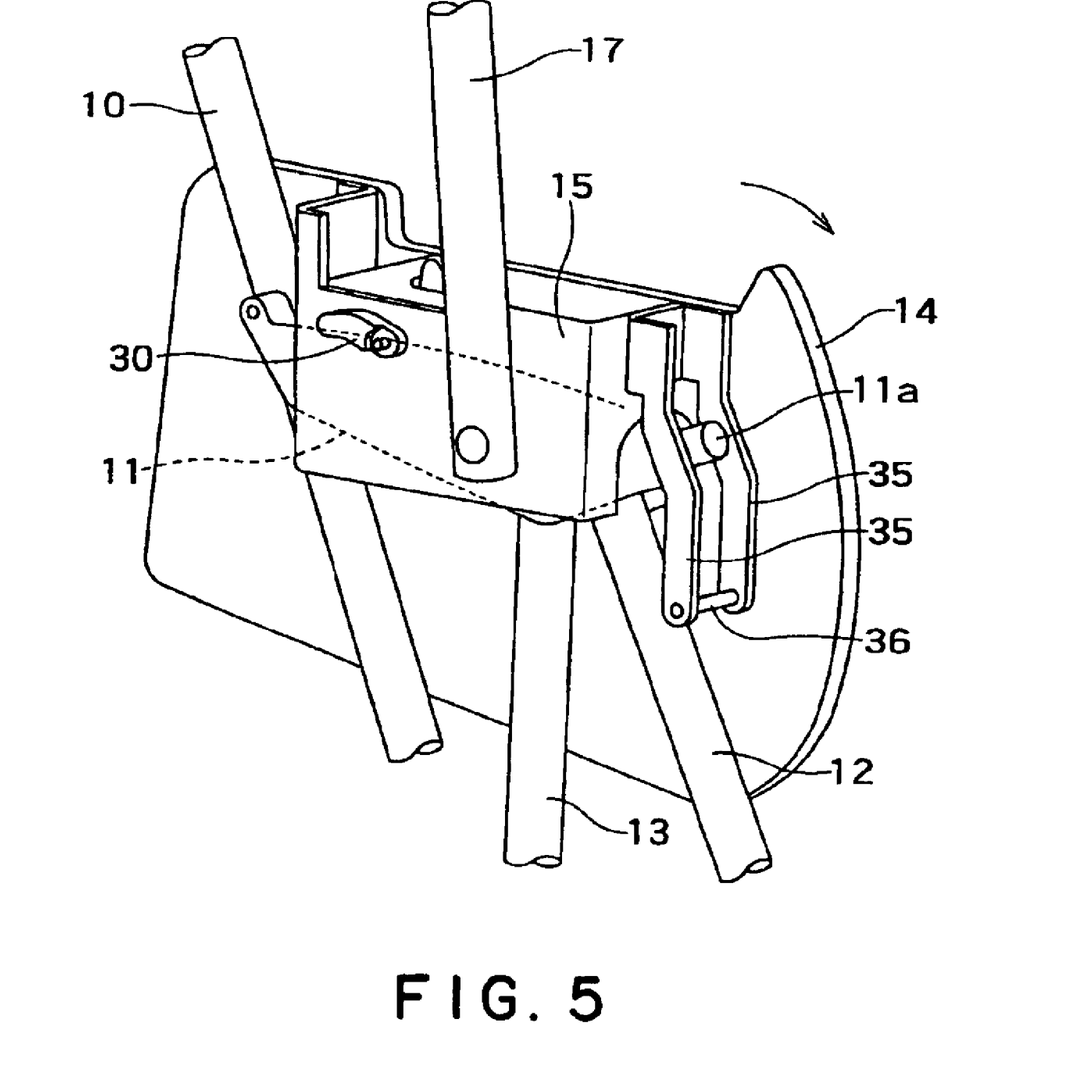
FIG. 5 is an enlarged perspective view showing a schematic constitution of a mounting part of a child car seat according to the present invention having a fall prevention member on a stroller.
Figure 6:
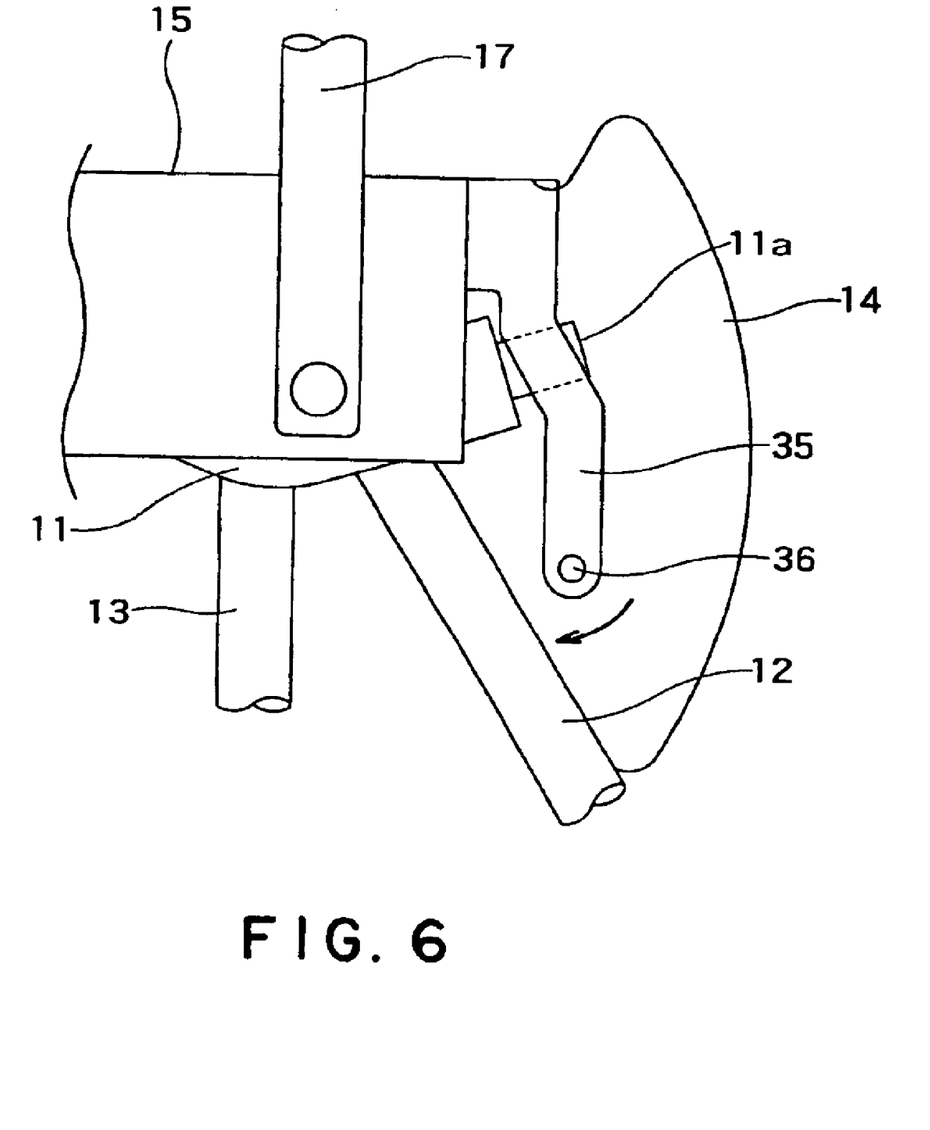
FIG. 6 is a partial side view of FIG. 5.

FIGS. 5 and 6 are a perspective view and a partial side view of an embodiment of the child car seat 1 on which a fall prevention member is disposed. A fall prevention member is disposed on the locking member 15 in a front surface side of the stroller body 5 in an advancing direction. The fall prevention member has two levers 35 which extend downwardly with sandwiching therebetween an armrest boss part 11a projected from a front end of the armrest 11 of the stroller body 5, and a locking rod 36 extending laterally between lower ends of the levers 35 and positioned forward the front leg.

When a force is applied to the child car seat 1 mounted on the stroller body 5, the child car seat 1 is slightly rotated in a falling direction indicated by the arrow about a junction point of an end of the armrest 11 and the locking member 15. Then, the locking rod 36 contacts the front leg 12 of the stroller body 5, whereby the rotation of the child car seat 1 is blocked so as to securely prevent the fall of the child car seat 1.

Figure 7A:
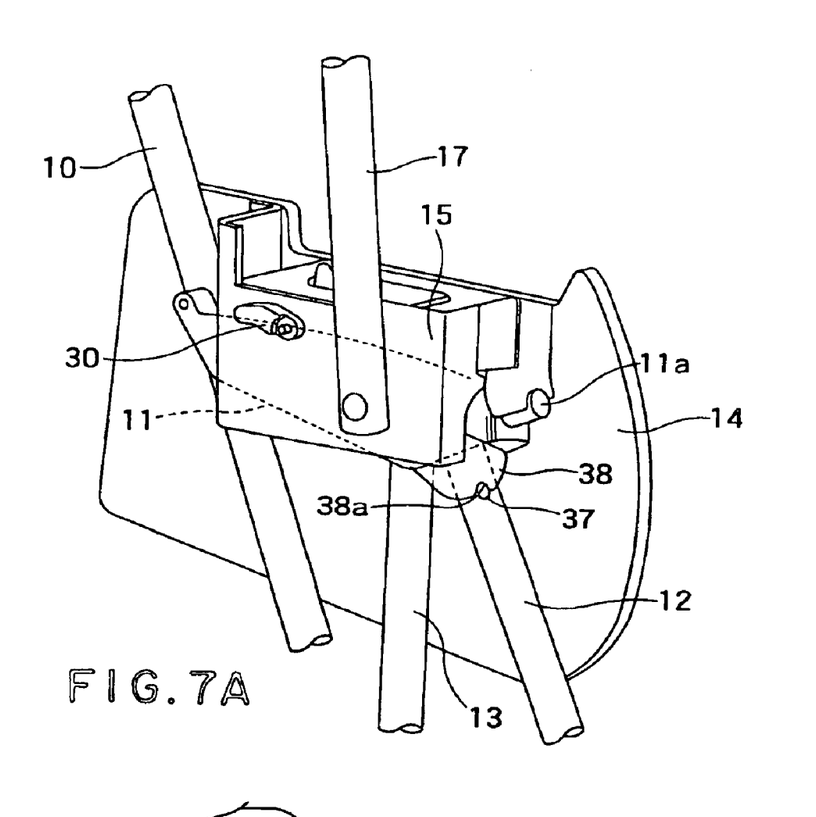
FIG. 7A is a perspective view showing a second embodiment of the present invention.

FIG. 7 is a view showing another embodiment of the fall prevention member. The fall prevention member includes an inclination prevention plate 38 which is disposed on an inner side surface of the locking member 15, that is, on an inner surface of a folded part of the locking member 15. The inclination prevention plate 38 is engaged with a boss 37 laterally projected from the front leg 12 of the stroller body 5. As shown in FIG. 7A, the inclination prevention plate 38 has a recess 38a formed at a lower periphery thereof. The recess 38a is engaged with the boss 37 laterally projected from the front leg 12 of the stroller body 5.

Figure 7B:
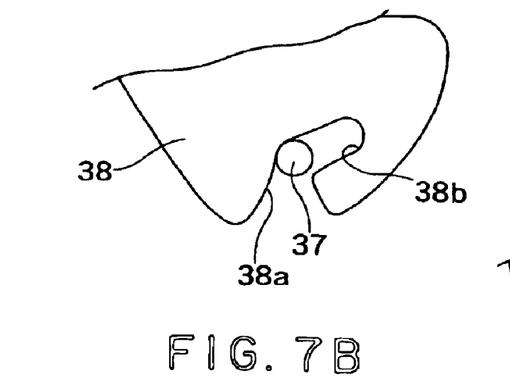
FIGS. 7B and 7C are views respectively showing other shapes of recesses formed in an inclination prevention plate.
Figure 7C:
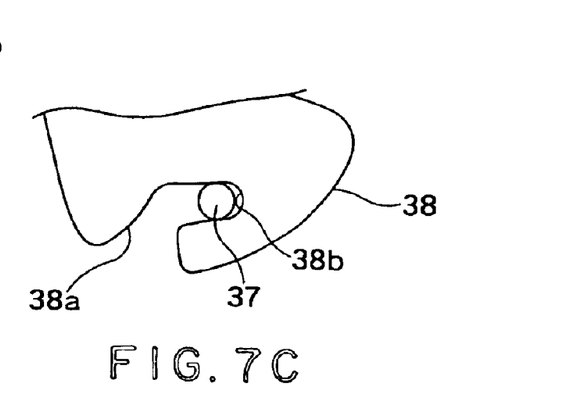

When the force in the falling direciton is applied to the child car seat 1, the rotation of the child car seat 1 is blocked and a fall of the child car seat 1 is securely prevented, because of the engagement of the inclination prevention plate 38 with the boss 37. Although FIG. 7A shows the inclination prevention plate 38 having the recess 38a, the inclination prevention plate 38 may, as shown in FIG. 7B, have a slit 38b adjacent to the recess 38a to extend in an advancing direction of the stroller body 5 to form a hook composed of the recess 38a and the slit 38b. In this case, when the child car seat 1 is rotated in the falling direction, as shown in FIG. 7C, the slit 38b is brought into engagement with the boss 37 so as to perfectly prevent a further rotation of the child car seat 1. Hence, a fall of the child car seat 1 can be prevented.

Figure 8:
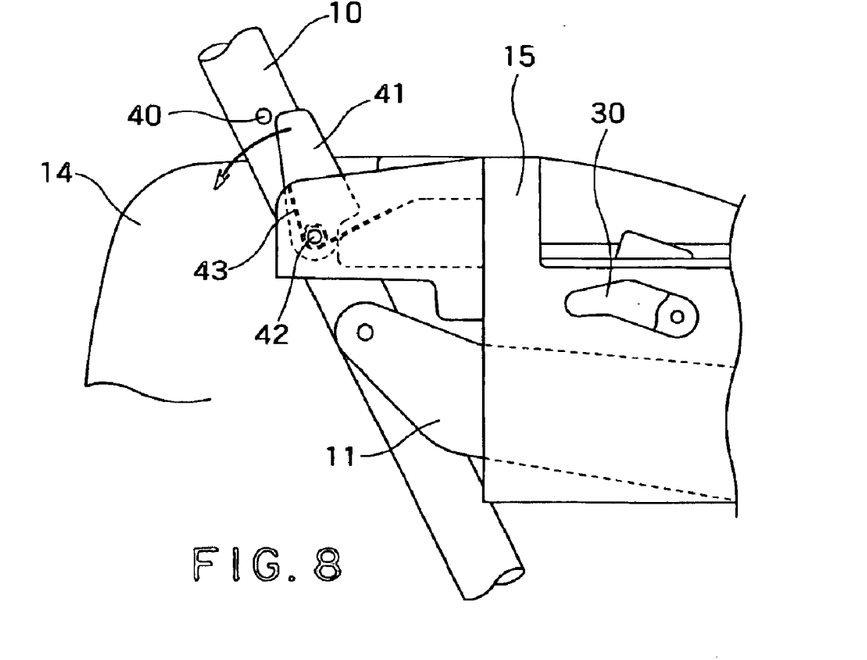
FIG. 8 is a view showing a third embodiment of the present invention.
Figure 9:
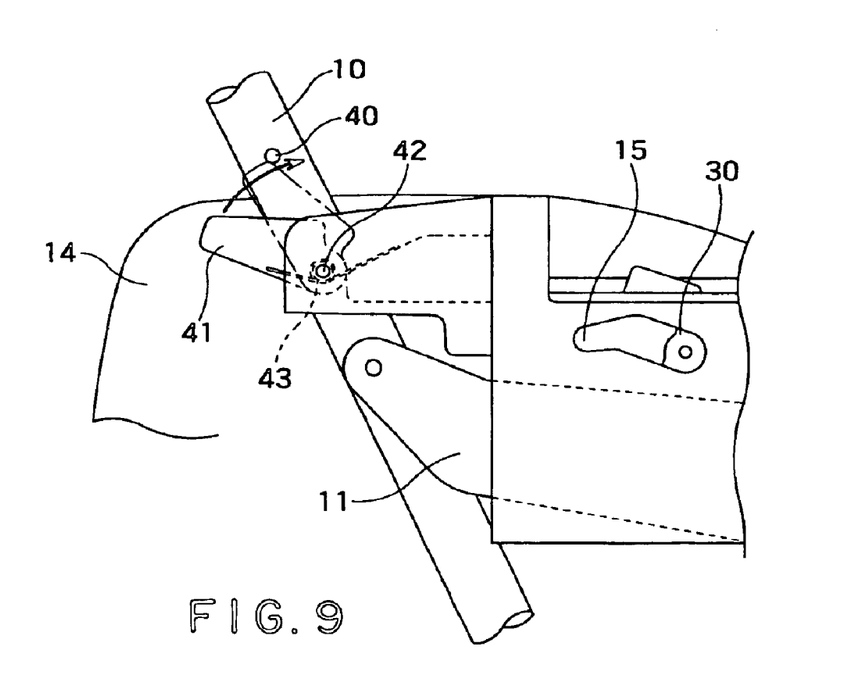
FIG. 9 is an illustrational view showing an operation of the embodiment in FIG. 8.

FIGS. 8 and 9 show another embodiment of the fall prevention member. The fall prevention member includes a locking lever 41 disposed on an end surface of the locking member 15 on a rear side (side of the hand push rod 10) of a stroller. When the child car seat 1 is rotated in the falling direction, the locking lever 41 contacts a boss 40 projected from the hand push rod 10 of the stroller. The locking lever 41 is projected from the locking member 15 and extended rearward the stroller (in a direction of the hand push rod 10 of the stroller body 5). The locking lever 41 is upwardly swingable about a shaft 42, and is urged by a spring 43 such that the locking lever 41 is inclined to project rearward the stroller (in a direction of the hand push rod 10).

In mounting the child car seat 1 on the stroller body 5, when the locking lever 41 contacts from above the boss 40 projected from the hand push rod 10 of the stroller body 5, the locking lever 41 is upwardly swung to resist the spring 43 as shown in FIG. 8. Therefore, there is no interference in mounting the child car seat 1 on the stroller body 5, and the child car seat 1 can be smoothly mounted thereon. As shown by the solid line in FIG. 9, the locking lever 41 is projected rearward the stroller (in a direction of the hand push rod 10) by means of the spring 43. When the force in the falling direction is applied to the child car seat 1, as shown by the chain double-dashed line in FIG. 9, the rotation in the falling direction brings the locking lever 41 into contact with the boss 40 projected from the hand push rod 10 of the stroller body 5. Consequently, a further rotation of the child car seat 1 is prevented whereby a fall of the child car seat 1 is securely prevented.

As described above, according to the present invention, a fall prevention member is mounted on the child car seat 1 which can be locked on or unlocked from a stroller body 5 by a locking/unlocking mechanism 16. The unlocked state can be maintained after leaving a locking/unlocking lever 30 as it is. When the child car seat 1 mounted on the stroller body 5 is rotated in the falling direction, the fall prevention member contacts the stroller body 5 so as to prevent a fall of the child car seat 1. Thus, in the case where the child car seat 1 is mounted incorrectly on the stroller body 5 with a locking device being unlocked, and a force pushing the child car seat 1 off the stroller body 5 is accidentally applied to the child car seat 1, a fall of the child car seat 1 is securely prevented to thereby improve a safety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A child car seat adapted to be mounted on a stroller body including a front leg, a hand push rod, and an armrest, said child car seat comprising:

a child car seat body to be fitted in the stroller body;

a locking member disposed on the child car seat body, said locking member being engageable with the armrest of the stroller body;

a locking/unlocking mechanism disposed on the locking member for locking the child car seat on the stroller body, and having a locking/unlocking lever, the locking/unlocking mechanism being unlocked and maintained in the unlocked state upon an operation of the locking/unlocking lever; and a fall prevention member connected to and extending from the locking member and preventing the child car seat from falling off the stroller body when the locking/unlocking mechanism is in the unlocked state.

2. The child car seat according to claim 1, wherein the fall prevention member extends downwardly from the locking member for contacting the front leg of the stroller body.

3. The child car seat according to claim 1, wherein the fall prevention member includes a laterally extended locking rod which is mounted on a lower end of a lever extending downwardly from the locking member.

4. The child car seat according to claim 3, wherein the locking rod is arranged for contacting the front leg of the stroller body.

5. The child car seat according to claim 1, wherein the fall prevention member includes a pair of levers extending downwardly from the locking member and a locking rod connecting lower ends of the pair of levers, said locking rod being positionable forward of the front leg.

6. The child car seat according to claim 1, wherein the fall prevention member includes an inclination prevention late disposed on the locking member, said inclination prevention plate being engageable with a boss laterally projected from the front leg of the stroller body.

7. The child car seat according to claim 6, wherein the inclination prevention plate has a recess, said recess being engageable with the boss.

8. The child car seat according to claim 7, wherein the inclination prevention plate has a slit adjacent to the recess, said slit extending in an advancing direction of the stroller body.

9. The car seat according to claim 1, wherein the fall prevention member includes a locking lever projecting from the locking member and extending rearward of the stroller body for contacting a boss projecting from the hand push rod of the stroller body.

10. The child car seat according to claim 9, wherein the locking lever is upwardly swingable, and is urged to project rearward of the stroller body.

11. The car child seat according to claim 10, wherein a spring is disposed between the locking lever and the locking member.

12. A child stroller, comprising:

a stroller body including a front leg, a hand push rod, and an armrest, and a child car seat detachably mounted on the stroller body, including:

a child car seat body to be fitted in the stroller body;

a locking member disposed on the child car seat body to be engaged with the armrest of the stroller body;

a locking/unlocking mechanism disposed on the locking member for locking the child car seat on the stroller body, and having a locking/unlocking lever, the locking/unlocking mechanism being unlocked and maintained in the unlocked state upon an operation of the locking/unlocking lever; and a fall prevention member connected to and extending from the locking member, wherein the fall prevention member contacts the stroller body and prevents the child car seat from falling off the stroller body when the locking/unlocking mechanism is in the unlocked state.

13. The child stroller according to claim 12, wherein the fall prevention member extends downwardly from the locking member to contact the front leg of the stroller body.

14. The child stroller according to claim 12, wherein the fall prevention member includes a laterally extended locking rod which is mounted on a lower end of a lever extending downwardly from the locking member.

15. The child stroller according to claim 14, wherein the locking rod contacts the front leg of the stroller body.

16. The child stroller according to claim 12, wherein the fall prevention member includes a pair of levers extending downwardly from the locking member and a locking rod connecting lower ends of the pair of levers and being positioned forward of the front leg.

17. The child stroller according to claim 12, wherein the fall prevention member includes an inclination prevention late disposed on the locking member to be engaged with a boss laterally projected from the front leg of the stroller body.

18. The child stroller according to claim 17, wherein the inclination prevention plate has a recess to be engaged with the boss.

19. The child stroller according to claim 18, wherein the inclination prevention plate has a slit adjacent to the recess to extend in an advancing direction of the stroller body.

20. The child stroller according to claim 12, wherein the fall prevention member includes a locking lever projected from the locking member and extending rearward of the stroller body to contact a boss projected from the hand push rod of the stroller body.

21. The child stroller according to claim 20, wherein the locking lever is upwardly swingable, and is urged to project rearward of the stroller body.

22. The child stroller according to claim 21, wherein a spring is disposed between the locking lever and the locking member.

* * * * *